United States Patent
Kopparapu et al.

(10) Patent No.: US 12,155,653 B2
(45) Date of Patent: Nov. 26, 2024

(54) SYSTEMS AND METHODS FOR PERFORMING SINGLE INPUT BASED MULTIFACTOR AUTHENTICATION

(71) Applicant: Tata Consultancy Services Limited, Mumbai (IN)

(72) Inventors: Sunil Kumar Kopparapu, Thane West (IN); Bimal Pravin Shah, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 189 days.

(21) Appl. No.: 18/059,541

(22) Filed: Nov. 29, 2022

(65) Prior Publication Data
US 2023/0300128 A1 Sep. 21, 2023

(30) Foreign Application Priority Data
Mar. 15, 2022 (IN) .............................. 202221013913

(51) Int. Cl.
*H04L 9/40* (2022.01)

(52) U.S. Cl.
CPC .......... *H04L 63/0869* (2013.01); *H04L 63/08* (2013.01); *H04L 63/0861* (2013.01); *H04L 63/18* (2013.01)

(58) Field of Classification Search
CPC . H04L 63/0869; H04L 63/08; H04L 63/0861; H04L 63/18
See application file for complete search history.

(56) References Cited

U.S. PATENT DOCUMENTS

| 8,365,258 B2 * | 1/2013 | Dispensa | ............ | H04L 63/0869 |
| | | | | 705/72 |
| 9,531,702 B2 * | 12/2016 | Grim | ..................... | H04W 12/06 |

(Continued)

OTHER PUBLICATIONS

Buriro, Attaullah et al., "Risk-Driven Behavioral Biometric-based One-Shot-cum-Continuous User Authentication Scheme", Journal of Signal Processing Systems Engineering Conference and Symposium on the Foundations of Software Engineering, Date: Sep. 2021, vol. 93, pp. 989-1006, Publisher: Springer, https://www.researchgate.net/publication/350713787_Risk-Driven_Behavioral_Biometric-based_One-Shot-cum-Continuous_User_Authentication_Scheme/link/6159bf94e7bb415a5d550004/download.

*Primary Examiner* — Cheng-Feng Huang
(74) *Attorney, Agent, or Firm* — Finnegan, Henderson, Farabow, Garrett & Dunner, LLP

(57) ABSTRACT

This disclosure relates to systems and methods for performing single input based multifactor authentication. Multifactor authentication refers to an authentication system with enhanced security which utilizes more than one authentication forms to validate identity of a user. Conventionally, the process of multifactor authentication is a serial process which involves inputting of authentication information multiple times. However, with conventional approaches, delay is introduced in execution of the multifactor authentication process. The method of the present disclosure addresses unresolved problems of multifactor authentication by enabling two or more factors to be assessed simultaneously making the authentication process faster without sacrificing the robustness of authentication process. Embodiments of the present disclosure analyzes spoken response of the user to a dynamically generated question for multifactor authentication. The system of the present disclosure is modulation, age and language independent, remote authentication (Continued)

enabled, and does not require any additional infrastructure leading to reduced cost.

15 Claims, 2 Drawing Sheets

(56) References Cited

U.S. PATENT DOCUMENTS

| | | | |
|---|---|---|---|
| 2013/0225129 A1* | 8/2013 | Norbisrath | H04L 63/105 455/411 |
| 2019/0050545 A1* | 2/2019 | Keret | G06F 21/32 |
| 2022/0172729 A1* | 6/2022 | Mohajer | G06F 21/31 |
| 2022/0342967 A1* | 10/2022 | Battle | G06V 40/171 |

* cited by examiner

SYSTEMS AND METHODS FOR PERFORMING SINGLE INPUT BASED MULTIFACTOR AUTHENTICATION

PRIORITY CLAIM

This U.S. patent application claims priority under 35 U.S.C. § 119 to: Indian Patent Application No. 202221013913, filed on Mar. 15, 2022. The entire contents of the aforementioned application are incorporated herein by reference.

TECHNICAL FIELD

The disclosure herein generally relates to the field of authentication, and, more particularly, to systems and methods for performing single input based multifactor authentication.

BACKGROUND

With growth of internet connectivity and network applications in recent years, use of internet for business functions has been increased. For example, applications involving online authentication such as online banking and other related applications are gaining momentum. Authentication refers to a process by which a user makes his or her identity known to a system or application which the user is attempting to access, and occasionally, also the process by which the user verifies the identity of the system being accessed. Authentication remains a persistent problem in information technology industry.

With the proliferation of untrusted applications and untrusted networks, the authentication of the user based on a single authentication mechanism becomes unreliable. For better reliability, concept of Multifactor authentication in the authentication systems becomes useful. "Multifactor authentication" refers to an authentication system which utilizes more than one authentication forms to validate identity of a user. Conventionally, the process of multifactor authentication is a serial process which involves inputting of authentication information multiple times. However, with conventional approaches, delay is introduced in execution of the multifactor authentication process.

SUMMARY

Embodiments of the present disclosure present technological improvements as solutions to one or more of the above-mentioned technical problems recognized by the inventors in conventional systems. For example, in one embodiment, a processor implemented method is provided. The method comprising: receiving, via one or more hardware processors, an initial identity information corresponding to a valid user requesting a service; obtaining, via the one or more hardware processors, a plurality of attributes and a plurality of reference voice features corresponding to the valid user that are pre-stored in a dynamically updated system database; dynamically generating, via the one or more hardware processors, a question based on the plurality of attributes corresponding to the valid user that are pre-stored in the dynamically updated system database using a probabilistic template based approach; generating, via the one or more processors, an audible recitation of the dynamically generated question in a first language from a set of languages identified from the plurality of attributes, wherein the audible recitation includes an added environmental noise; requesting, via the one or more processors, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database; transforming, via the one or more hardware processors, the plurality of incoming voice features and the plurality of reference voice features to maximize a separation between contours and a subset of high energy points in a spectrogram of the spoken response and a synthetically generated response; and determining, via the one or more hardware processors, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

In another aspect, a system is provided. The system comprising a memory storing instructions; one or more communication interfaces; and one or more hardware processors coupled to the memory via the one or more communication interfaces, wherein the one or more hardware processors are configured by the instructions to: receive, via one or more hardware processors, an initial identity information corresponding to a valid user requesting a service; obtain, via the one or more hardware processors, a plurality of attributes and a plurality of reference voice features corresponding to the valid user that are pre-stored in a dynamically updated system database; dynamically generate, via the one or more hardware processors, a question based on the plurality of attributes corresponding to the valid user that are pre-stored in the dynamically updated system database using a probabilistic template based approach; generate, via the one or more processors, an audible recitation of the dynamically generated question in a first language from a set of languages identified from the plurality of attributes, wherein the audible recitation includes an added environmental noise; request, via the one or more processors, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database; transform, via the one or more hardware processors, the plurality of incoming voice features and the plurality of reference voice features to maximize a separation between contours and a subset of high energy points in a spectrogram of the spoken response and a synthetically generated response; and determine, via the one or more hardware processors, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

In yet another aspect, a non-transitory computer readable medium is provided. The non-transitory computer readable medium, comprising: receiving, via one or more hardware processors, an initial identity information corresponding to a valid user requesting a service; obtaining, via the one or more hardware processors, a plurality of attributes and a plurality of reference voice features corresponding to the valid user that are pre-stored in a dynamically updated system database; dynamically generating, via the one or more hardware processors, a question based on the plurality of attributes corresponding to the valid user that are pre-stored in the dynamically updated system database using a probabilistic template based approach; generating, via the one or more processors, an audible recitation of the dynamically generated question in a first language from a set of languages identified from the plurality of attributes, wherein the audible recitation includes an added environmental noise; requesting, via the one or more processors, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database; transforming, via the one or more hardware processors, the plurality of incoming voice features and the plurality of reference voice features to maximize a separation between contours and a subset of high energy points in a spectrogram of the spoken response and a synthetically generated response; and determining, via the one or more hardware processors, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

In accordance with an embodiment of the present disclosure, the step of receiving the initial identity information comprises a comparison of a received user identification number to a user identification number stored in a system database.

In accordance with an embodiment of the present disclosure, the plurality of attributes comprises speech properties of the valid user, personal identification information of the valid user, and information related to one or more past actions relevant to the service availed by the valid user.

In accordance with an embodiment of the present disclosure, the plurality of incoming voice features and the plurality of reference voice features comprise voice signatures.

In accordance with an embodiment of the present disclosure, the one or more metrics include quickness to respond to a dynamically generated question, pronunciation quality, proximity of the speech properties of the spoken response with the speech properties comprised in the plurality of attributes corresponding to the valid user that are pre-stored in the dynamically updated system database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
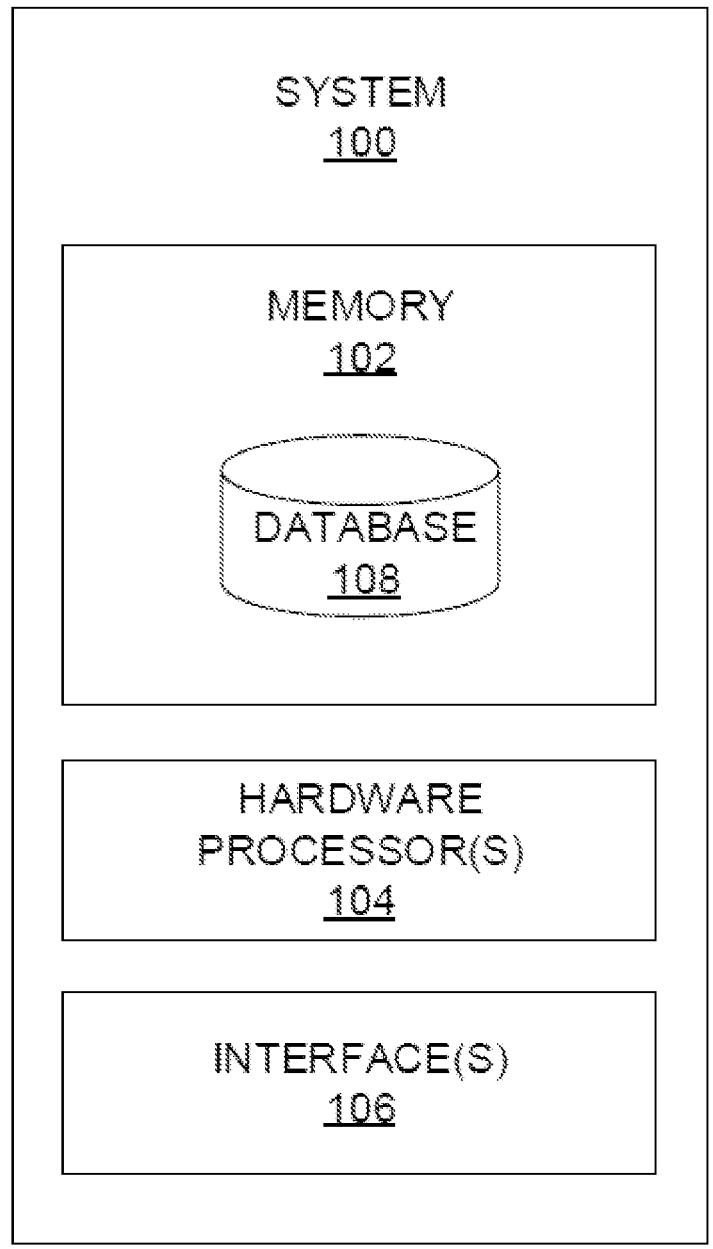
FIG. 1 illustrates an exemplary system for performing single input based multifactor authentication according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

"Multifactor authentication" refers to an authentication system with enhanced security which utilizes more than one authentication forms to validate identity of a user. Conventionally, the process of multifactor authentication is a serial process which involves inputting of authentication information multiple times. However, with conventional approaches, delay is introduced in execution of the multifactor authentication process. For example, several multifactor authentication systems allow a user to input his/her login credentials as a first factor of authentication for accessing an application. The system further asks the user to provide a second factor of authentication in form of an authentication code, biometric, and by any other means only once the first factor of authentication is completed.

In multifactor authentication, a person can be verified based on what the person has (e.g., smart card, mobile phone), what the person knows (e.g., password, his/her personal details), what the person is (e.g., fingerprint, voice, face). Here, "Has", "Knows", and "Is" are three factors of authentication. For example, smart-card ("Has")+PIN ("Knows") or smart-card ("Has")+Fingerprint ("Is") is very common with underlying assumption that the person is at a certain location where the smart-card or fingerprint reader is present (say office entrance). However, in case of remote verification such as in a pandemic scenario, some of these multifactor authentications become infeasible because the location of the person and often an Rivest, Shamir, Adleman (RSA) token ("Has")+password PIN ("Knows") is the go to multifactor authentication adopted. Further, all these have an economic implication in terms of RSA device, Fingerprint scanner etc.

The present disclosure addresses unresolved problems of multifactor authentication by enabling two or more factors to be assessed simultaneously/in a parallel manner making the authentication process faster without sacrificing the robustness of authentication process. Embodiments of the present disclosure provide systems and methods for performing single input based multifactor authentication without using any special hardware infrastructure. In one non-limiting example, a person to be verified enters his user id (say employee number) on a web-page. The system of the present disclosure generates a natural language sentence (say "My father was born in the year 1970") and presents an incomplete sentence (say "My father was born in the year")

in distorted text to the person. The person is required to complete the sentence and speak the sentence for him to get authenticated. The distorted text makes sure that it is a person (Turing test). The spoken voice is used to "Is" verify the person, and the spoken "Know" verifies the person making it a multi-factor authentication. In another example when a person calls a phone-banking system. His registered mobile number (RMN) enables the system of the present disclosure to generate a complete sentence (say "My father was born in the year 1970") and speak an incomplete sentence (say "My father was born in the year") and ask the person to complete the sentence.

Again, the spoken voice is used to "Is" verify the person, and the spoken "Know" verifies the person making it a multi-factor authentication.

In an embodiment, there are scenarios where with growing age of the valid user, chances of change in voice may occur. Further, in certain cases, a person may acquire fluency in a foreign language resulting in change in accent of the person. The system of the present disclosure is capable to deal with such scenarios. Thus, the system of present disclosure is independent of age factors, modulation independent, and language independent Referring now to the drawings, and more particularly to FIGS. 1 and 2, where similar reference characters denote corresponding features consistently throughout the figures, there are shown preferred embodiments and these embodiments are described in the context of the following exemplary system and/or method.

FIG. 1 illustrates an exemplary system 100 for performing single input based multifactor authentication according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the system database 108 stores the plurality of input data/output, pre-processed data, personal identity information of one or more users requesting a service, a plurality of attributes and a plurality of reference voice features corresponding to the valid user, a plurality of incoming voice features, a plurality of dynamically generated questions and data associated with the plurality of dynamically generated questions, and/or the like. In an embodiment, the system database 108 is dynamically updated.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
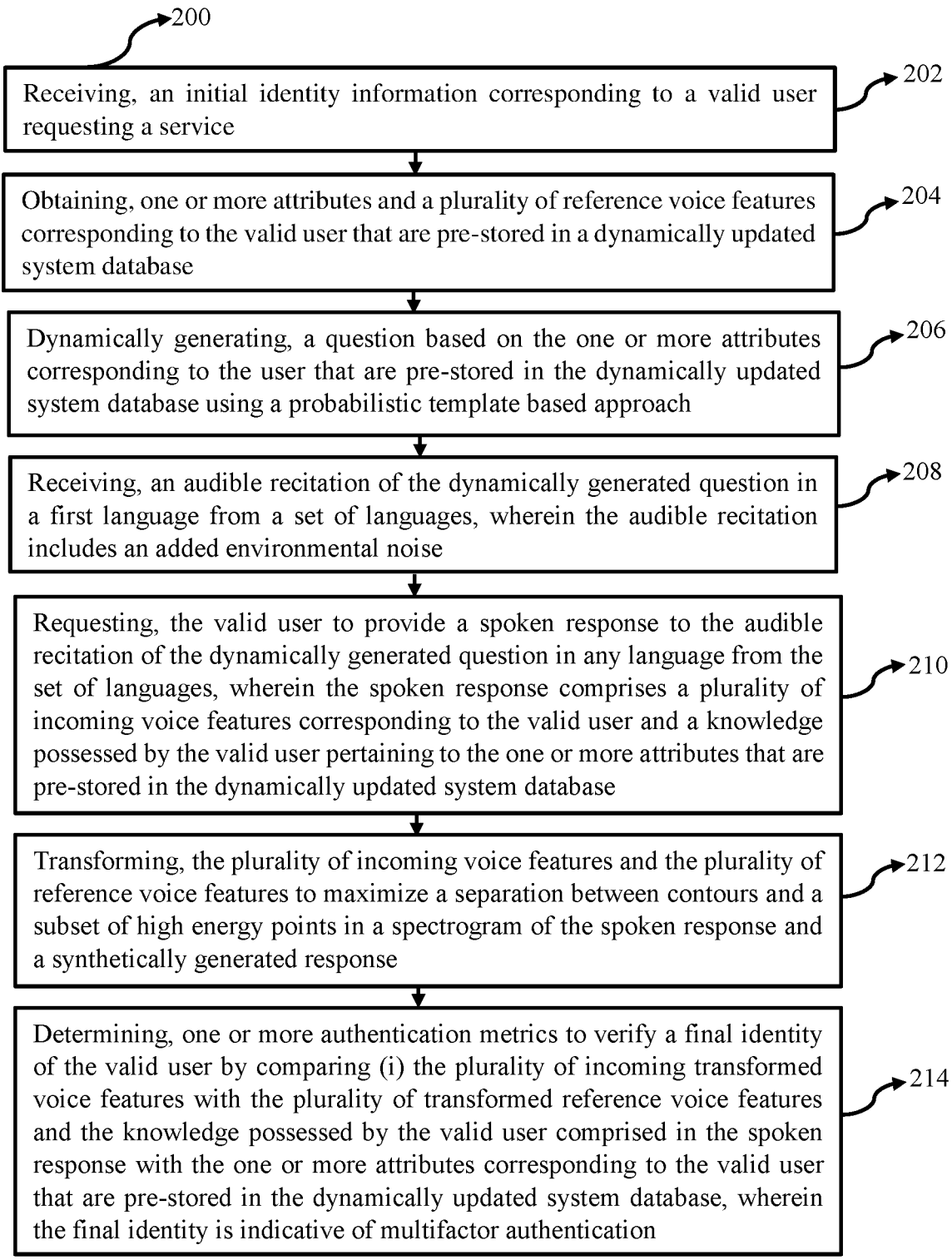
FIG. 2 depicts an exemplary flow diagram illustrating a method for performing single input based multifactor authentication according to some embodiments of the present disclosure.

FIG. 2, with reference to FIG. 1, depicts an exemplary flow chart illustrating a method 200 for performing single input based multifactor authentication, using the system 100 of FIG. 1, in accordance with an embodiment of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, and the flow diagram as depicted in FIG. 2. In an embodiment, at step 202 of the present disclosure, the one or more hardware processors 104 are configured to an initial identity information corresponding to a valid user requesting a service. In an embodiment, the service requested by the valid user may include but not limited to accessing online banking application, financial transaction related application, retail based applications and/or the like. In the context of the present related, the expression 'valid user' refers to an actual existing and an actual new user who are trying to access an application for requesting service, but not an imposter. In an embodiment, the expression 'valid user' and 'user' can be used interchangeably. In an embodiment, the step of receiving the initial identity information comprises a comparison of a received user identification number to a user identification number stored in a system database. In an embodiment, the user identification number may include but not limited to a registered mobile number, a user id such as an employee id, and/or the like. For example, a user X calls a bank from his mobile number and the system of the proposed disclosure reads the received mobile number. The received mobile number is mapped to all the registered mobile numbers stored in the system database. Based on the mapping, name of the person against the registered mobile number is identified from the system database.

In an embodiment, at step 204 of the present disclosure, the one or more hardware processors 104 are configured to obtain, a plurality of attributes and a plurality of reference voice features corresponding to the valid user that are pre-stored in a dynamically updated system database. In an embodiment, the plurality of attributes comprises speech properties of the valid user, personal identification information of the valid user, and information related to one or more past actions relevant to the service availed by the valid user. In an embodiment, the speech properties of the valid user may include but not limited to response time, pitch variation, inter syllable duration, pronunciation quality, percentage of pauses, percentage of filler words, shimmer, fluency, and speaking rate. In an embodiment, the personal identification information may include but not limited to date of birth (DoB) of the valid user, DoB of wife, names and DoB of mother and father of the valid user, educational background, number of language spoken and understood by the valid user, and/or the like. In an embodiment, the information related to one or more past actions relevant to the service availed by the valid user may include but not limited to purchase history further including date of last purchase of an item, which item was purchased, how much quantity of item was purchased by the user.

In an embodiment, at step 206 of the present disclosure, the one or more hardware processors 104 are configured to dynamically generate, a question based on the plurality of attributes corresponding to the valid user that are pre-stored in the dynamically updated system database using a probabilistic template based approach. It must be appreciated that the probabilistic template based approach is known in the art. In an embodiment, question generation is dynamic since it considers last updated information stored in the system database. For example, a dynamic question is generated for the user X initially verified based on his register mobile number by analyzing past four dynamic transaction records of the user X. In an embodiment, process of dynamic question generation is initiated by the system of the present disclosure when it is known that user X needs to be verified. The system of the present disclosure picks up past four records (say N=4 records) associated with the user X which may include but not limited to credit card history, commerce transaction history. The system of the present disclosure selects one of the N=4 transactions using the probabilistic template based approach explained using the below example. In an embodiment, a random number $r_1$ between 0 and 1 is generated by the system of present disclosure. If the value of $r_1$ in the ranges of $0<r_1<0.5$ (latest of the 4 transaction records), $0.5<r_1<0.75$, $0.75<r_1<0.9$, $0.9<r_1<1.0$ (oldest of the 4 transaction records) is selected then the system of present disclosure gives more weight to selection of the most recent transaction record. For example, the selected transaction record is represented by "T"={12/2/2022|22.5 $|17 roses|buyflowers.com}. Further, the system of present disclosure generates another random number $r_2$ between 0 and 1 and decides whether the user should be asked about a number or a transaction based on a maximum value of probability of occurrence. If the system determines that a number has to be asked to the valid user, then the dynamically generated question may include information related to but not limited to price of item of last purchase, number of items purchased, when an item was purchased. However, if the system determines that a transaction has to be asked to the valid user, then the dynamically generated question may include information related to but not limited to what purchased, where purchased, how purchased, and/or the like. If the system chooses a type "P" {buyflowers.com}, then the dynamically generated question is generated using "T" and "P". For example, the dynamically generated question could be "Where did you use your credit card to make the latest purchase?" and the system would know that the expected answers is "My latest purchase was from buyflowers.com or I made an online purchase of roses yesterday".

In an embodiment, at step 208 of the present disclosure, the one or more hardware processors 104 are configured to generate, an audible recitation of the dynamically generated question in a first language from a set of languages identified from the plurality of attributes. Here, the audible recitation includes an added environmental noise. In other words, the dynamically generated question is recited by the system of the present disclosure or the user using a text to speech conversion technique. It must be appreciated that any standard and known in the art text to speech conversion technique could be used in the system of the present disclosure. In an embodiment, the set of languages include a number of languages understood and a number of languages spoken by the user.

In an embodiment, at step 210 of the present disclosure, the one or more hardware processors 104 are configured to request, the valid user to provide a spoken response to the audible recitation of the dynamically generated question in a specific language among the set of languages. In an embodiment, the spoken response comprises a plurality of incoming voice features corresponding to the valid user and a knowledge possessed by the valid user pertaining to the plurality of attributes that are pre-stored in the dynamically updated system database. In an embodiment, the plurality of incoming voice features and the plurality of reference voice features are different from each other. In an embodiment, the plurality of incoming voice features and the plurality of reference voice features comprise voice signatures. In an embodiment, the knowledge possessed by the valid user is indicative of an information stored in the dynamically updated system database that is only known by the valid user and provided as an answer for the dynamically generated questions.

In an embodiment, the spoken response received from the valid user in response to the audible recitation of the dynamically generated question (Q) is denoted by x(t). The spoken response x(t) comprises of two parts, (a) what part, denoted by $x_{what}(t)$ which contains an "answer" to the question Q and (b) who part, denoted by $x_{who}(t)$ which contains characteristics of the user (Alternatively referred as speaker here). Initially, complete spoken response of the user or speaker, namely x(t) is taken as input by the system of present disclosure. Further, x(t) is converted into text using an automatic speech recognition engine. It must be appreciated that the automated speech recognition engine is known in the art. Further, start and end time corresponding to the answer for the dynamically generated question are identified based on the automatic speech recognition process. The start and end time corresponding to the answer are denoted by $\mu^s$ and $\mu^e$ respectively. Further, $x_{what}(t)$ is extracted from x(t) using a unit step function $\Delta(t)$ in accordance with equation (1) provide below:

$$x_{what}(t)=x(t)*(\Delta(t-\mu^s)-\Delta(t-\mu^e)) \quad (1)$$

Here, $\mu^e > \mu^s$ and $$\Delta(t-\mu)=1 \text{ for } t>\mu.$$

Further, $x_{who}(t)$ is determined by eliminating $x_{what}(t)$ part from the spoken response x(t) as shown in equation (2) provided below:

$$x_{who}(t)=x(t)-x_{what}(t) \quad (2)$$

In an embodiment, at step 212 of the present disclosure, the one or more hardware processors 104 are configured to transform, the plurality of incoming voice features and the plurality of reference voice features to maximize a separation between contours and a subset of high energy points in a spectrogram of the spoken response and a synthetically generated response. In an embodiment, the step of transformation is performed to analyze an audio segment $x_{what}(t)$ which is a part of the spoken response x(t). The step of transformation is better understood by way of the following non-limiting example provided as exemplary explanation For example, a scenario is considered where a person 'Ram' has purchased a Parker pen from "Haldiram and Sons" shop in Bandra on 1 Feb. 2022 at 1800 hours using his credit card and has paid 257 rupees. In this scenario, the system of the present disclosure needs to ask a Question to 'Ram'. For example, the system of the present disclosure decides to ask the price of the item purchased in Hindi and expects a response in Telugu since the system of the present disclosure is aware that 'Ram' can understand Hindi but speaks Telugu. So, the system of the present disclosure generates a question "How much did you pay for your Parker pen yesterday?" in Hindi and expects an answer "two hundred and fifty seven" in Telugu. Let the audio response of 'Ram' be x(t)="I paid two hundred and fifty seven rupees yesterday for a pen" in Telugu. First the system of the present disclosure determines if x(t) is in Telugu using a spoken language identification module. It must be appreciated that any known in the art spoken language identification module may be used for language identification. Further, using a Telugu Automatic Speech Recognition approach, x(t) is converted into Telugu and the start time and the end time of x(t) are estimated. Speech utterances between $\mu^e$ and $\mu^s$ represent the audio segment $x_{what}(t)$. The system of the present disclosure then computes a spectrogram of the audio segment $x_{what}(t)$. Further, a contour plot from the spectrogram and top 5 percent high energy points in the spectrogram of the audio segment $x_{what}(t)$ are extracted. Furthermore, a synthetically generated response $s_{what}(t)$ is generated by the system of the present disclosure using a personalized text to speech engine in 'Ram' voice. The system 100 further computes the spectrogram of synthetically generated response $s_{what}(t)$ and the contour plot from the spectrogram and top 5 percent high energy points in the spectrogram of the synthetically generated response $s_{what}(t)$ are extracted. Furthermore, a distance d indicative of the separation between contours plots and top 5% high energy points in the spectrogram of $x_{what}(t)$ and $s_{what}(t)$ is determined. If the distance does not exceed a first predetermined threshold as shown in equation (3) below, the system of the present disclosure verifies what 'Ram' knows. This means that the knowledge possessed by 'Ram' is verified.

$$d(s_{what}, x_{what}(t)) < \beta \quad (3)$$

Here $\beta$ is the first pre-determined threshold that is selected depending on the application.

In an embodiment, the system 100 performs analysis of an audio segment $x_{who}(t)$. For the $x_{who}(t)$ analysis, the system 100 of the present disclosure accesses apriori feature vector of 'Ram' denoted $\{f_v(Ram)\}$. From the spoken response x(t), the system of the present disclosure is able to extract the audio segment $x_{who}(t)$ using equation (2). Further, a feature vector ($f_v$) from the audio segment $x_{who}(t)$ is extracted. Here, $x_{who}(t)$ consists of features such as syllable/sec, pauses/sec, pitch variations, inter-syllable distance, pronunciation quality, jitter, shimmer, and/or the like. Further, a cosine distance $c_d$ between the $f_v$ and the $\{f_v(Ram)\}$ is determined. If cosine distance $c_d$ does not exceed a second predetermined threshold as shown in equation (4) below, the system of the present disclosure verifies that person is 'Ram'.

$$c_d(f_v, \{f_v(Ram)\}) < \pi \quad (4)$$

Here $\pi$ is the second pre-determined threshold that is selected depending on the application.

In an embodiment, at step 214 of the present disclosure, the one or more hardware processors 104 are configured to determine, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database 108. Here, the final identity of the valid user is indicative of multifactor authentication.

In an embodiment, the one or more metrics may be quickness to respond to a dynamically generated question, pronunciation quality, proximity of the speech properties of the spoken response with the speech properties comprised in the plurality of attributes corresponding to the valid user that are pre-stored in the dynamically updated system database 108. In other words, it is determined how quickly the valid user responds when he is asked to provide answer to a dynamically generated question in a language proposed by the system of the present disclosure. For example, if the system of the present disclosure knows that a valid user understands Hindi but fluent in speaking English by accessing personal information of the valid user prestored in the dynamically updated system database 108, then the system of the present disclosure may ask the question to the valid user in Hindi but asks him to respond in English. If the valid user is an imposter, he may be identified based on a deviation in quickness to respond metric, pronunciation quality, and speech properties.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The system of the present disclosure is remote authentication enabled, does not require any additional infrastructure leading to reduced cost and the multifactor authentication happens in one-shot or simultaneously leading to faster processing. The system of present disclosure is independent of age factors, modulation independent, and language independent.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, an initial identity information corresponding to a valid user requesting a service;
   obtaining, via the one or more hardware processors, a plurality of attributes and a plurality of reference voice features corresponding to the valid user that are pre-stored in a dynamically updated system database;
   dynamically generating, via the one or more hardware processors, a question based on the plurality of attributes corresponding to the valid user that are pre-stored in the dynamically updated system database using a probabilistic template based approach;
   generating, via the one or more processors, an audible recitation of the dynamically generated question in a first language from a set of languages identified from the plurality of attributes, wherein the audible recitation includes an added environmental noise;
   requesting, via the one or more processors, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database;
   transforming, via the one or more hardware processors, the plurality of incoming voice features and the plurality of reference voice features to maximize a separation between contours and a subset of high energy points in a spectrogram of the spoken response and a synthetically generated response; and
   determining, via the one or more hardware processors, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

2. The processor implemented method of claim 1, wherein the step of receiving the initial identity information comprises a comparison of a received user identification number to a user identification number stored in a system database.

3. The processor implemented method of claim 1, wherein the plurality of attributes comprises speech properties of the valid user, personal identification information of the valid user, and information related to one or more past actions relevant to the service availed by the valid user.

4. The processor implemented method of claim 1, wherein the plurality of incoming voice features and the plurality of reference voice features comprise voice signatures.

5. The processor implemented method of claim 1, wherein the one or more metrics include quickness to respond to a dynamically generated question, pronunciation quality, proximity of the speech properties of the spoken response with the speech properties comprised in the plurality of attributes corresponding to the valid user that are pre-stored in the dynamically updated system database.

6. A system, comprising:
   a memory storing instructions;
   one or more communication interfaces; and
   one or more hardware processors coupled to the memory via the one or more communication interfaces, wherein the one or more hardware processors are configured by the instructions to:
   receive, via one or more hardware processors, an initial identity information corresponding to a valid user requesting a service;
   obtain, via the one or more hardware processors, a plurality of attributes and a plurality of reference voice features corresponding to the valid user that are pre-stored in a dynamically updated system database;

dynamically generate, via the one or more hardware processors, a question based on the plurality of attributes corresponding to the valid user that are pre-stored in the dynamically updated system database using a probabilistic template based approach;

generate, via the one or more processors, an audible recitation of the dynamically generated question in a first language from a set of languages identified from the plurality of attributes, wherein the audible recitation includes an added environmental noise;

request, via the one or more processors, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database;

transform, via the one or more hardware processors, the plurality of incoming voice features and the plurality of reference voice features to maximize a separation between contours and a subset of high energy points in a spectrogram of the spoken response and a synthetically generated response; and determine, via the one or more hardware processors, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

7. The system of claim 6, wherein the step of receiving the initial identity information comprises a comparison of a received user identification number to a user identification number stored in a system database.

8. The system of claim 6, wherein the plurality of attributes comprises speech properties of the valid user, personal identification information of the valid user, and information related to one or more past actions relevant to the service availed by the valid user.

9. The system of claim 6, wherein the plurality of incoming voice features and the plurality of reference voice features comprise voice signatures.

10. The system of claim 6, wherein the one or more metrics include quickness to respond to a dynamically generated question, pronunciation quality, proximity of the speech properties of the spoken response with the speech properties comprised in the plurality of attributes corresponding to the valid user that are pre-stored in the dynamically updated system database.

11. One or more non-transitory machine-readable information storage mediums comprising one or more instructions which when executed by one or more hardware processors cause:

receiving, an initial identity information corresponding to a valid user requesting a service;

obtaining, a plurality of attributes and a plurality of reference voice features corresponding to the valid user that are pre-stored in a dynamically updated system database;

dynamically generating, a question based on the plurality of attributes corresponding to the valid user that are pre-stored in the dynamically updated system database using a probabilistic template based approach;

generating, an audible recitation of the dynamically generated question in a first language from a set of languages identified from the plurality of attributes, wherein the audible recitation includes an added environmental noise;

requesting, the valid user to provide a spoken response to the audible recitation of the dynamically generated question in a specific language among the set of languages, wherein the spoken response comprises a plurality of incoming voice features corresponding to the valid user and a knowledge possessed by the valid user pertaining to the plurality of attributes that are pre-stored in the dynamically updated system database;

transforming, the plurality of incoming voice features and the plurality of reference voice features to maximize a separation between contours and a subset of high energy points in a spectrogram of the spoken response and a synthetically generated response; and determining, one or more authentication metrics to verify a final identity of the valid user by comparing (i) the plurality of incoming transformed voice features with the plurality of transformed reference voice features and the knowledge possessed by the valid user comprised in the spoken response with the plurality of attributes corresponding to the valid user that are pre-stored in the dynamically updated system database.

12. The one or more non-transitory machine-readable information storage mediums of claim 11, wherein the step of receiving the initial identity information comprises a comparison of a received user identification number to a user identification number stored in a system database.

13. The one or more non-transitory machine-readable information storage mediums of claim 11, wherein the plurality of attributes comprises speech properties of the valid user, personal identification information of the valid user, and information related to one or more past actions relevant to the service availed by the valid user.

14. The one or more non-transitory machine-readable information storage mediums of claim 11, wherein the plurality of incoming voice features and the plurality of reference voice features comprise voice signatures.

15. The one or more non-transitory machine-readable information storage mediums of claim 11, wherein the one or more metrics include quickness to respond to a dynamically generated question, pronunciation quality, proximity of the speech properties of the spoken response with the speech properties comprised in the plurality of attributes corresponding to the valid user that are pre-stored in the dynamically updated system database.

* * * * *